April 23, 1963  A. SCHMECKENBECHER  3,086,340
PROCESS OF REMOVING NICKEL CARBONYL VAPOR
FROM GASES CONTAINING THE SAME
Filed Nov. 12, 1958
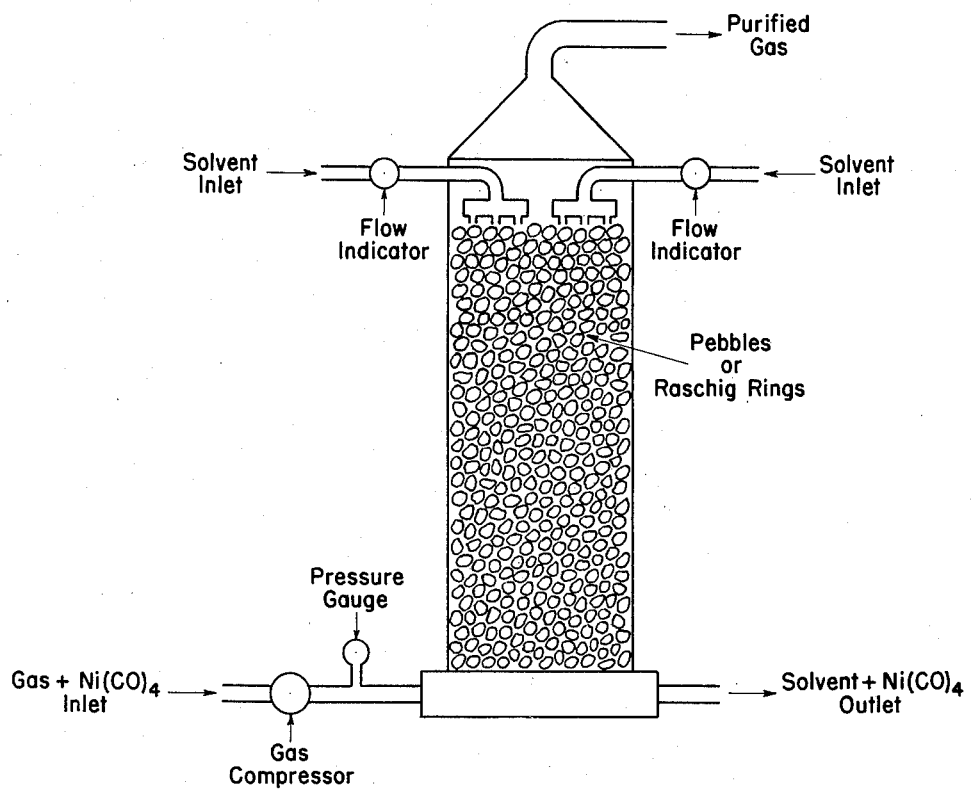
Arnold Schmeckenbecher
INVENTOR
BY
ATTORNEYS

United States Patent Office 3,086,340
Patented Apr. 23, 1963

3,086,340
PROCESS OF REMOVING NICKEL CARBONYL VAPOR FROM GASES CONTAINING THE SAME
Arnold Schmeckenbecher, Westfield, N.J., assignor to General Aniline & Film Corporation, New York, N.Y., a corporation of Delaware
Filed Nov. 12, 1958, Ser. No. 773,352
1 Claim. (Cl. 55—66)

The present invention relates to an improved process of removing nickel carbonyl (nickel tetracarbonyl, $$Ni(CO)_4$$

from a gas or mixture of gases containing the same.

Nickel tetracarbonyl has been classified by the American Industrial Hygiene Association as an extra hazardous substance with acute and possibly chronic effects on the human body. In the manufacture of nickel powder from nickel carbonyl and generally in handling liquid nickel carbonyl, gases which have been in contact with nickel carbonyl are contaminated by nickel carbonyl vapor. On account of the safety hazard it is necessary to remove nickel carbonyl from such gases before they are used for other purposes. For economical reasons it is desirable to recover the nickel carbonyl.

It is well known that nickel tetracarbonyl vapor may be removed from a gas such as carbon monoxide, nitrogen, helium and the like, by passing the gas with the carbonyl vapor over activated charcoal, activated silica or other solid adsorbents. This procedure while effective for removing the nickel carbonyl vapor, is quite expensive in view of the high cost of the adsorbents. Moreover, it is exceedingly difficult to recover the nickel carbonyl from the adsorbent material. Once the solid adsorbent has become saturated with nickel carbonyl it must be replaced by a fresh batch, thus increasing considerably the cost of the processing since no method is available for removing the nickel carbonyl from the solid adsorbent.

It is an object of the present invention to provide an efficient and relatively inexpensive process of removing nickel carbonyl vapor from a gas or a gas mixture containing the same and recovering the nickel carbonyl.

Other objects and advantages will become more clearly manifest from the following description.

I have found that nickel carbonyl vapor can be removed from a gas stream, or a stream containing a mixture of gases, very effectively by passing the gas through any conventional air or gas scrubber containing a solvent which is selective for nickel carbonyl. Such specific and selective solvents are benzene, toluene, tetrahydrofuran, carbon tetrachloride and glacial acetic acid. If exposure to light is avoided a substantial part of the nickel carbonyl vapor is recovered from the selective solvent as such. Since these selective solvents do not react with the nickel carbonyl, the latter is not decomposed during the time required to pass the gas through the solvent in any conventional air or gas scrubber washer. In other words, the solution of the nickel carbonyl in the solvent is stable provided undue exposure to light is avoided for a sufficient period of time to permit recovery of the nickel carbonyl by the conventional methods, preferably by fractional distillation.

The gas or gaseous mixture containing nickel carbonyl vapor is passed through any conventional gas scrubber. The gas may be passed horizontally through banks of sprays which may be directed downward, upward, into a gas stream, or with the gas stream. The conventional water jet scrubber (FIG. 130, page 1035 of Chemical Engineers Handbook by John H. Perry, 3rd edition), may be effectively utilized for the purose of the present invention by replacing the water by a flow of the foregoing specific solvents. It is to be noted that the nature or character of the scrubbing apparatus is immaterial since any scrubbing apparatus utilized in the chemical industry, such as cyclone scrubbers, inertial scrubbers, film scrubbers, pack scrubbers and the field gas scrubber may be effectively employed for the purpose of the present invention. The only limitation, in fact a prerequisite, being that the interior of the inlet and outlet lines as well as the interior of the scrubber apparatus be constructed of material resistant to nickel carbonyl, such as for example, glass, ceramic, stoneware, stainless steel, etc. The field scrubber or spray type operates by throwing a thin screen of the selective solvent across the path of the incoming gas thereby removing the nickel carbonyl. A scrubber of this type is described on pages 1558–9, FIG. 38 of John H. Perry's Chemical Engineers Handbook, 2d edition. However, for the purpose of the present invention, I prefer to utilize a gas scrubber of the type shown in the self-explanatory flow sheet of the accompanying drawing. The scrubber shown in the flow sheet may be connected to two or more of the same type scrubbers in series. In operating the apparatus shown in the flow sheet of the accompanying drawing, the selective solvent is introduced into the solvent inlet and the flow adjusted by means of any conventional flow indicator. The scrubbing tower may range anywhere from several feet to as high as 30 feet maximum with a width of 1 to 3 feet. The scrubbing tower is filled with either pebbles or raschig rings or glass beads having a diameter of ½ to 2 inches. The beads or pebbles may be either round or irregular surfaces. As for the raschig rings, the preferred diameter is from 1 to 3 inches. After the scrubber has been filled with pebbles or raschig rings, the selective solvent is introduced until all of the pebbles or rings are completely submerged in the solvent. The gas or gas mixture containing nickel carbonyl vapor is introduced at room temperature at its normal pressure. If its normal pressure is too low, i.e. slightly above atmospheric, a gas compressor is put into operation and the pressure adjusted by means of the pressure gauge so that it is sufficient to push the gas through the solvent against the hydrostatic pressure. If the tower is 30 ft. high it will be necessary to increase the normal pressure by about 1 atmosphere; if the tower is shorter or if other types of scrubbing towers are used, such as the spray scrubbers mentioned above, the pressure needed is correspondingly smaller. After the gas has surged through the scrubbing bed, the solvent outlet is opened and the solvent containing the nickel carbonyl vapor is directed to a fractional distillation column and the recovered solvent passed to the solvent inlet. The solvent inlet flow indicator is adjusted to give a continuous flow of solvent countercurrent to the gases to be purified. In lieu of the two solvent inlets shown in the flow sheet, four to six separate inlets may be provided and the flow control through each one adjusted. Instead of two or more solvent inlets, the conventional Brassert disintegrator nozzle (Kinney, Blast Furnace Steel Plant 31 113, January 1943) may be employed.

The scrubbing action of the foregoing selective solvents can be very readily demonstrated by a simple routine experiment. Any gas or gaseous mixture containing carbonyl vapor may be employed. However, for purpose of illustration, carbon monoxide gas saturated with nickel carbonyl vapor at 0° C. was available and utilized for this experiment.

50 ml./min. of the gas mixture were passed through a series of 3 conventional washing bottles containing 50 mls. of the solvent each. The solvents utilized are shown in the following table. The gas stream coming out of the washing bottles was continuously tested for nickel carbonyl by passing it through a heated thin glass tube and checking for the deposit of a black nickel mirror. The time required for the nickel carbonyl to "break through" the series of washing bottles was then determined. The results obtained are as follows:

| Solvent: | Time, min. |
|---|---|
| Water | 1.5 |
| Half conc. nitric acid | 4 |
| 5% ammoniacal copper solution | 5 |
| Absolute ethyl alcohol | 7 |
| Benzene | 40 |
| Toluene | 45 |
| Tetrahydrofuran | 45 |
| Carbon tetrachloride | 45 |
| Glacial acetic acid | 45 |

From the foregoing results, it is clearly manifest that the last 5 organic solvents are unusual in their selectivity for the removal of nickel carbonyl from a gas stream. The mixture of the extracting solvent and nickel carbonyl is stable for about an hour or more if exposure to light is avoided. As previously noted, the nickel carbonyl is readily separated from the solvent by usual conventional methods, preferably by fractional distillation.

During the course of my experimentation with the present invention, I also found that if glacial acetic acid is employed as a solvent, the nickel carbonyl can be separated therefrom very readily. Nickel carbonyl is completely miscible with concentrated glacial acetic acid, while it is soluble to only slight extent in diluted acetic acid. Accordingly therefore, it is only necessary to add water to a mixture of the nickel carbonyl and glacial acetic acid in order to recover the nickel carbonyl in a separate liquid phase which can be drawn off from the bottom of the containing vessel. This was readily demonstrated by the following experiment:

To a mixture of 15 ml. of nickel carbonyl in 45 ml. of glacial acetic acid, 40 ml. of distilled water were added. Immediately 2 layers formed. The bottom layer consisted by 15 ml. of clear nickel carbonyl which was drawn off through a separatory funnel. By washing the nickel carbonyl layer with water, the layer can be freed from traces of acetic acid clinging to it. The remaining top layer contains traces of nickel carbonyl which then is readily removed by any conventional method such as vaporizing or decomposing the nickel carbonyl.

I claim:

The process of removing nickel carbonyl vapor in admixture with at least one gas selected from the class consisting of carbon monoxide, nitrogen and helium, which comprises scrubbing the admixture with glacial acetic acid followed by dilution of said acid with water and removing the nickel carbonyl in a separate liquid phase.

References Cited in the file of this patent

UNITED STATES PATENTS 1,431,981    Richter _____ Oct. 17, 1922

OTHER REFERENCES

A Dictionary of Chemical Solubilities, by Comey & Hahn, 2nd edition, MacMillan Co., N.Y., 1921, page 537.

The Volatile Metal Carbonyls, by A. B. Blanchard, Chem. Reviews, vol. 21, No. 1, August 1937, pages 12 and 13.